United States Patent [19]
Stewart et al.

[11] Patent Number: 6,085,590
[45] Date of Patent: Jul. 11, 2000

[54] MULTISENSOR WITH PARAMETRIC ROTOR DRIVE

[75] Inventors: Robert E. Stewart, Woodland Hills; Samuel N. Fersht, Studio City, both of Calif.

[73] Assignee: Litton Systems, Inc., Woodland Hills, Calif.

[21] Appl. No.: 09/126,829

[22] Filed: Jul. 31, 1998

[51] Int. Cl.[7] .................................. G01P 3/44; G01P 9/00
[52] U.S. Cl. ........................................................ 73/504.03
[58] Field of Search ........................... 73/504.04, 504.03, 73/510

[56] References Cited

U.S. PATENT DOCUMENTS

| | | | |
|---|---|---|---|
| 4,621,529 | 11/1986 | Pittman | 73/510 |
| 4,715,227 | 12/1987 | Pittman | 73/504.03 |
| 4,841,773 | 6/1989 | Stewart | 73/510 |
| 4,996,877 | 3/1991 | Stewart et al. | 73/510 |
| 5,007,289 | 4/1991 | Stewart et al. | 73/510 |
| 5,065,627 | 11/1991 | Stewart et al. | 73/510 |

*Primary Examiner*—Richard A. Moller
*Attorney, Agent, or Firm*—Elliott N. Kramsky

[57] ABSTRACT

A multisensor includes a ring-like piezoelectric drive. The ring, which may comprise a closed configuration formed of straight ring segments, surrounds a rotor assembly formed of a pair of rotors, each having a central hub. Vanes extend radially from the central hubs of the rotors to the inner surface of the ring and are fixed to the ring adjacent the intersections of the substantially-straight ring segments. The ring is formed of a laminate of layers of piezoelectric material. Adjacent layers are of opposite piezoelectric polarity whereby an a.c. signal drives the alternating expansions and contractions of pairs of laminated layers.

26 Claims, 8 Drawing Sheets

MULTISENSOR WITH PARAMETRIC ROTOR DRIVE

BACKGROUND OF THE INVENTION

1. Field of the Invention

The present invention relates to inertial multisensor navigation units (IMU's) for short range, relatively low-accuracy guidance applications, such as munitions. More particularly, this invention pertains to a multisensor in which the rotors are driven by means of an outlying ring of piezoelectric composition.

2. Description of the Prior Art

IMU's measure space-dependent accelerations and rotation, or angular, rates with respect to orthogonal space axes. Their design is beset by numerous complexities, as it requires the simultaneous measurement of six independent variables. For example, gyroscopes of the ring laser type require a lasing cavity dedicated to each input axis. This mandates a total of three lasing cavities, an expensive undertaking, to obtain three of the six required measurements. (An example of a laser device for measuring rotation about three axes is shown in U.S. Pat. No. 4,795,258 of Graham Martin, property of the assignee herein, entitled "Nonplanar Three-Axis Ring Laser Gyro With Shared Mirror Faces".) IMU's employing spinning wheel gyros must deal with their limitation to measurement of rotation with respect to two axes, necessitating the use of an additional drive and servo-mechanism for the third and (redundant) fourth input axes. Again, this does not account for the additional complexity introduced by the remaining acceleration measurements.

Simplicity and economy are particularly significant in the design of IMU's for munitions guidance and like applications. Such uses are characterized by non-reusable payloads, limited flight durations and only moderate accuracy requirements. One economical type of system for measuring both rotation rates and linear acceleration with reference to a set of three orthogonal axes is the multisensor mechanism disclosed, for example, in the following United States patents, alsco the property of the assignee herein: U.S. Pat. No. 4,996,877, entitled, "Three Axis Inertial Measurement Unit With Counterbalanced Mechanical Oscillator"; U.S. Pat. No. 5,007,289, entitled, "Three Axis Inertial Measurement Unit With Counterbalanced, Low Inertia Mechanical Oscillator"; and U.S. Pat. No. 5,065,627 entitled, "Three Axis Inertial Measurement Unit With Counterbalanced, Low Inertia Mechanical Oscillator". The devices disclosed in the above-referenced patents employ piezoelectric drive mechanisms to drive a pair of counterbalanced platforms to oscillate out-of-phase about a common axis within a housing or case. Accelerometers, housed in a vacuum to avoid the effects of gas damping, are mounted at tilted attitudes (for measuring variables in orthogonal planes) with respect to radially-directed elements of the platforms to provide measures of both linear acceleration and rotation. The latter (rotation) values are derived from the (Coriolis) forces sensed by the accelerometers at the resonant frequency of the counter-oscillating structure.

In order to effect the necessary oscillatory motion, piezoelectric elements are fixed to opposed surfaces of webs of drive elements, the ends of which are fixed to the case of the multisensor, that radiate from a central hub. The distal ends of pairs of webs are joined by arcuate elements. The inner portions of rotor arms that support the accelerometers are fixed to the hub so that induced rotation of the central hub results in the rotation or oscillation of the rotor-fixed accelerometers required for measurement of Coriolis forces. The piezoelectric elements are appropriately-poled so that an input drive signal simultaneously induces compression and tension at the opposed web surfaces to cause their bending or flexing (in alternating directions) to produce oscillation of the rotor hubs.

The above-described method for driving the rotors at the self resonant frequency and at a set amplitude (established through the use of pickoff electrodes that feed back oscillation amplitude) is subject to a number of disadvantages. An approximately twenty (20) volt signal amplitude is required to drive the multisensor rotors to achieve an acceptable twenty (20) inches per second peak tangential velocity (a more desirable peak tangential velocity would be in the range of forty (40) inches per second). Additionally, multisensors configured as described above require a multiplicity of piezoelectric elements (and associated electrodes). A current design requires twenty-four (24) piezo elements—two for each of twelve drive webs or beams. The installation and wiring of such a multiplicity of piezo elements is both complex and costly. Finally, it has been found that such designs have difficulty in achieving the type of start-up times (on the order of one second) required to operate at self-resonance with high Q (approximately 1,000).

SUMMARY OF THE INVENTION

The preceding and other shortcomings of the prior art are addressed by the present invention, which provides a multisensor. The multisensor includes a substantially-planar mounting base. An upper and a lower rotor are provided, each including a central rotor hub and at least one radially-directed arm having a distal end, the arm being fixed to the hub. The rotors are aligned along a common central axis and are coupled to one another to form a rotor assembly. An accelerometer is fixed adjacent to the distal ends of the rotor arms.

At least one vane extends radially from the hub of each of the upper and lower rotors. Distal ends of the vanes are remote from the associated rotor hubs. A ring surrounds the rotor assembly. The distal ends of the vanes are fixed to the inner surface of the ring, such ring being of piezoelectric composition. At least one standoff is fixed, at its opposed ends, to the ring and to the base. An electrical circuit is coupled to the ring for supplying an electrical signal to cause the radial dimension of the ring to expand and contract.

The foregoing and other features; and advantages of this invention will become further apparent from the detailed description that follows. Such description is accompanied by a set of drawing figures. Numerals of the drawing figures, corresponding to those of the written description, point to the various features of the invention with like numerals referring to like features throughout both the written description and the drawing figures.

BRIEF DESCRIPTION OF THE DRAWINGS

FIGS. 1(a), sheets 1 and 2 and 1(b) are exploded perspective and cross-sectional side elevation views of a multisensor in accordance with the present invention, respectively, it being understood that the cross sectional view is taken of the multisensor after assembly;

DETAILED DESCRIPTION OF THE PREFERRED EMBODIMENT

Figure 1A:
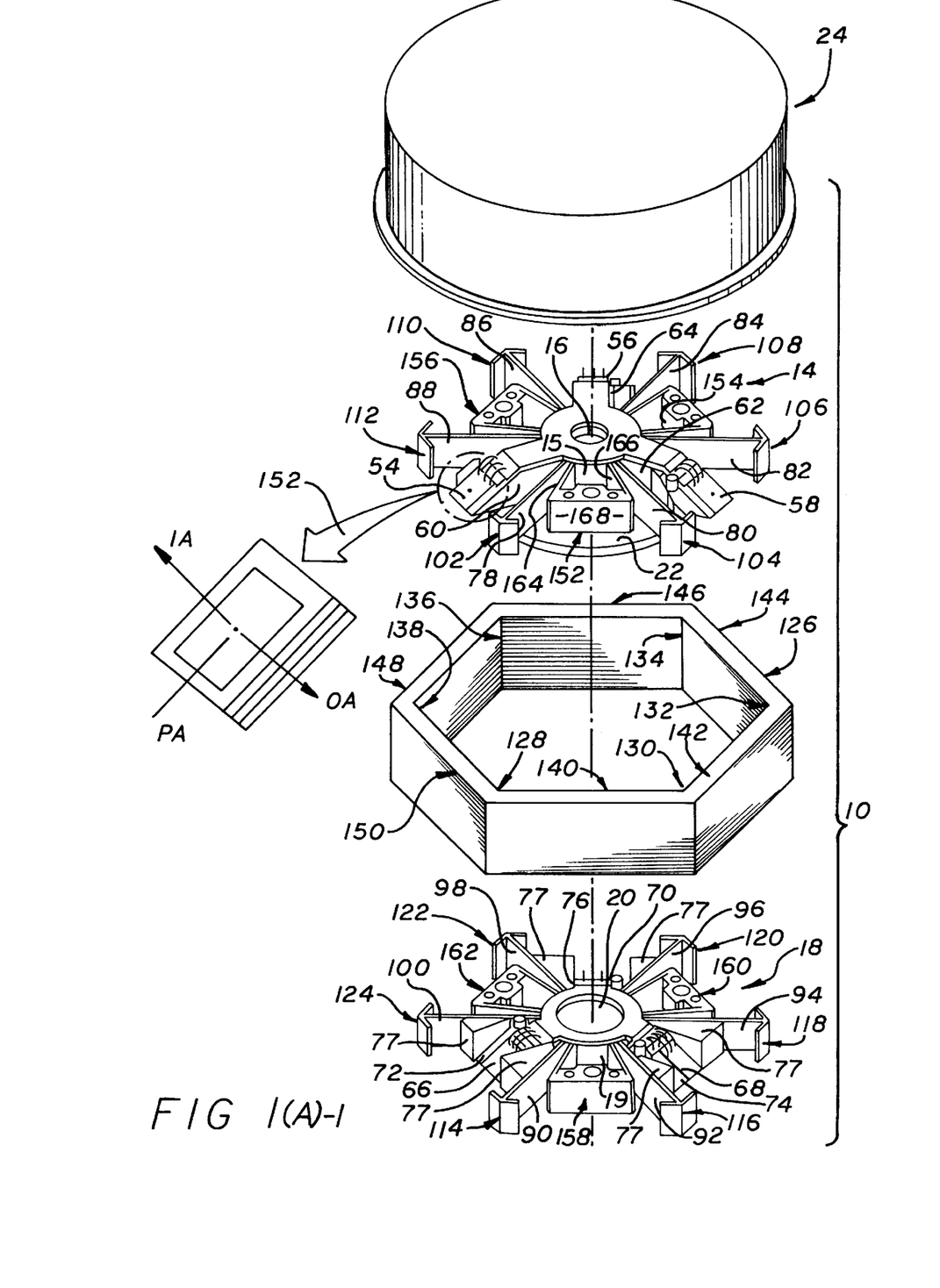
Figure 1A:
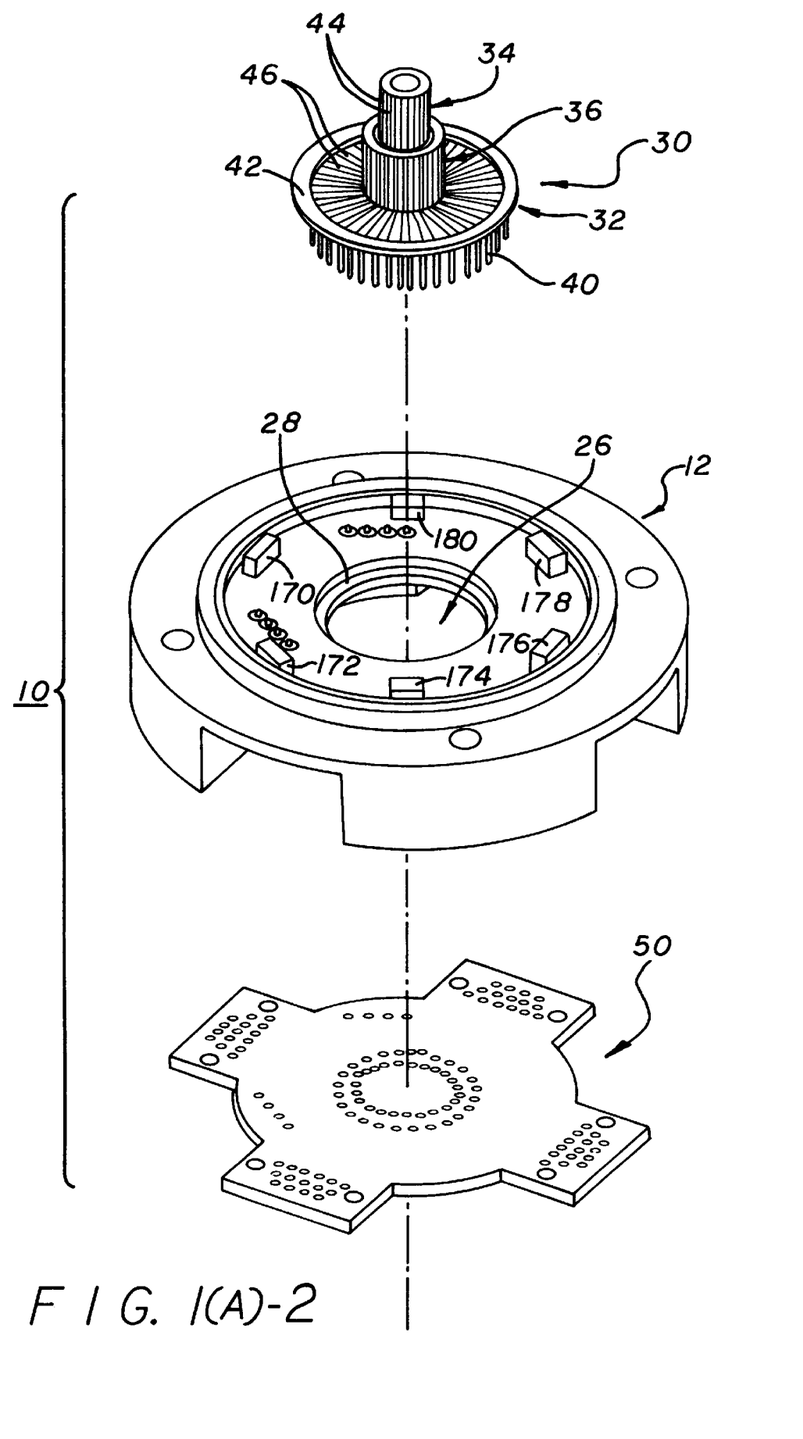
Figure 1B:
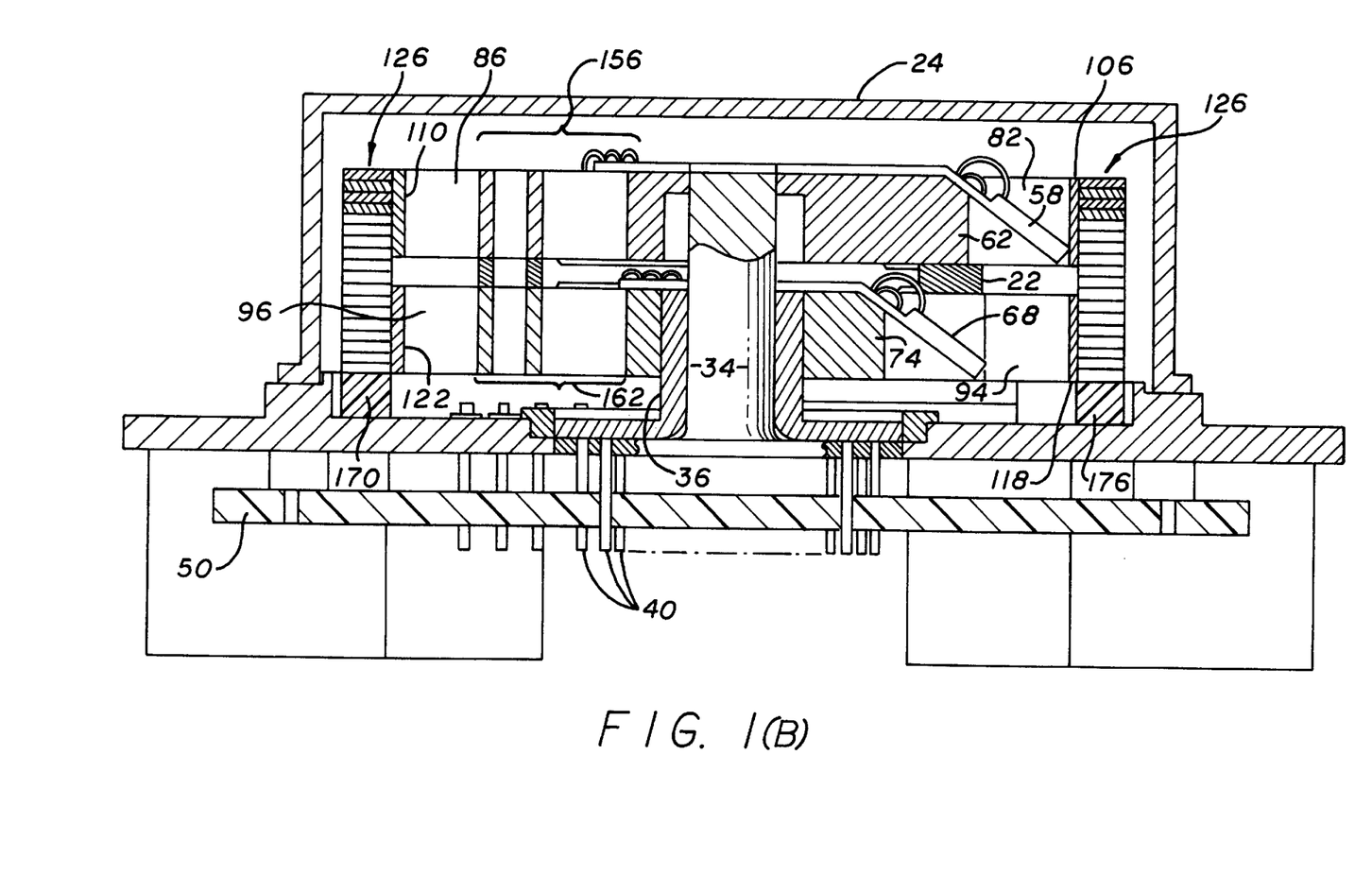

Initial reference is made to FIGS. 1(a) and 1(b) in combination, representing exploded perspective and cross-sectional side elevation views of a counterbalanced IMU 10 in accordance with the invention. The principal components and arrangements of the invention may be seen to include a substantially-planar mounting base 12 that serves both for mounting various multisensor mechanisms, and as a means for mounting the multisensor assembly 10 to another body (not illustrated).

The active mechanisms of the multisensor 10 include a rotor assembly comprising an upper rotor 14 having a central hub 15 with an internal bore 16 and a lower rotor 18 also having a central hub 19 with a somewhat larger internal bore 20. The rotors 14 and 18 are mechanically coupled to one another for counter-oscillation at a common frequency about a common central axis by means of an inner coupling ring 22. (The ring 22 is shown associated with the upper rotor 14 in FIG. 1. However, as shown in FIG. 1(b) below, the ring 22 needn't be integral with either one of the rotors 14 or 18.)

A domed cover 24 is attached (e.g., by resistance welding), to the mounting base 12. Should the accelerometer of the multisensor require a vacuum environment, the cover 24 would thereby hermetically seal the base 12.

The mounting base 12 includes a central aperture 26 and a concentric counterbore 28. A two-part ceramic post-like lead guide 30 is aligned concentrically with the aperture 26. The guide 30 is preferably of alumina (i.e., $AlO_2$), and includes a flanged base 32 and a cylindrical strut comprising coaxial inner and outer struts 34, 36 that extend upwardly from the base 32 that provide pathways for electrical signals in communication with the accelerometers of the upper and lower rotors 14 and 18 respectively.

The flanged base 32 of the lead guide 30 has a plurality of metal-plated holes arrayed in a circular pattern about the coaxial struts 34 and 36. Conductive feed-through pins 40, preferably gold-plated, protrude through the base 32. The pins 40 may be sealably fixed to the associated pinholes (e.g., by brazing) to insure a hermetic seal against vacuum leakage, if desired. A peripheral ring 42, preferably of KOVAR, or other low coefficient-of-expansion metal, is disposed within the counterbore 28. A first plurality of conductive paths 44 is plated onto the surface of the strut 34. The paths 44 extend radially inward from the feed-through pins 40 and, thence, up the surface of the strut 34 in a direction parallel to the central axis, to the planar upper end of the lead guide 30 to terminate, eventually, in electrical connection with the accelerometers mounted to the upper rotor 14.

Conductive paths 46 are plated onto the surface of the lower strut 36. The plated paths 46 extend radially inward from the feed-through pins 40 thence up the surface of the lower or outer strut 36 in a direction parallel to its central axis. Each path 46 terminates at the upper edge 48 of the strut 36 in a connection pad (not shown) that facilitates electrical connection with the accelerometers of the lower rotor 18. The two separate, electrically isolated sets of conductive paths 44 and 46 of the lead guide 30, when appropriately connected (e.g., by wire bonding) to selected ones of the feed-through pins 40, enable convenient and efficient routing of electrical signals to and from the accelerometers of the rotors 14 and 18 respectively.

A printed circuit board 50 is connected, e.g., by soldering, to the plurality of feed-through pins 40 at the underside of the mounting base 12. The circuit board 50 mounts and interconnects a variety of electrical control elements (e.g., preamplifier electronics for use with the output signals of servo-controlling accelerometers fixed to the rotors 14 and 18). The circuit board 50 may, in turn, interconnect with external electronics by means of multi-pin connectors (not shown) located on the side of the mounting base 12.

Both low and resonant frequency accelerations are sensed by responsive mechanical apparatus. Planar, pendulous-mass linear accelerometers are each mounted at an angle relative to the parallel planes of the upper and lower rotors 14 and 18. Accelerometers 54, 56 and 58 are mounted adjacent distal ends of radially-directed rotor arms 60, 62 and 64 respectively of the upper rotor 14 while accelerometers 66, 68 and 70 are similarly mounted to rotor arms 72, 74 and 76 respectively of the lower rotor 18.

Each of the accelerometers 54, 56 and 58 is mounted substantially parallel to the corresponding accelerometer 66, 68 and 70, requiring the arms 72, 74 and 76 of the lower rotor 18 to be shorter than corresponding arms 60, 62 and 64 of the upper rotor 14 to permit the accelerometers to be positioned so that, when the two rotors 14 and 18 are assembled together in a static condition, the input axes of corresponding accelerometers lie along a common axis orthogonal to their planes (as best shown in FIG. 1(b) below).

As the rotor arms of the lower rotor 18 are shorter than those of the upper rotor 14, their contributions to the moments of inertia of the respective rotors will differ. As it is highly desirable that the rotors 14 and 18 counter-oscillate at a single, resonant frequency, compensating elements or masses 77, are provided on the lower rotor 18 which are configured and positioned such that the moments of inertia of the upper and lower rotors 14 and 18 are substantially equalized to facilitate counteroscillation of the composite rotor assembly at a common frequency.

Interspersed between the rotor arms of the upper rotor 14 and the lower rotor 18 are radially-extending drive vanes 78 through 88 and 90 through 100 respectively. The proximate ends of the vanes 78 through 88 are fixed to the central hub 15 of the upper rotor 14 while the corresponding ends of the drive vanes 90 through 100 are fixed to the central hub 19 of the lower rotor 18.

The distal ends of the vanes 78 through 88 terminate in corner flanges 102 through 112 while those of the drive vanes 90 through 100 terminate in corner flanges 114 through 124. A hexagonal ring 126 surrounds the rotor assembly comprising the upper rotor 14 in combination with the lower rotor 18. In the assembled multisensor 10, the edge flanges 102 through 124 contact the corners 128 through 138 of the hexagonal ring 126, being bonded thereto by means of EPOXY or like adhesive as shown best in FIGS. 4(a) and 4(b) below. The corners 128 through 138 of the hexagonal ring 126 are defined by the intersections of substantially-straight ring segments 140 through 150.

The hexagonal ring 126 is formed of a plurality of layers of piezoelectric material. As will be described below, the layers comprising the ring 126 are arranged and wired in pairs and driven by an a.c. signal which causes the alternating expansion and contraction of the circumferential dimension (along with proportionate expansion and contraction of the diagonal distances between opposed corners 128 through 138 thereof). It will be seen that such variation in the dimensions of the activated ring 126 results in the alternating out-of-phase buckling of the sets of drive vanes 78 through 88 and 90 through 100 respectively, thereby causing out-of-phase oscillations of the hubs 15 and 19 of the upper and lower rotors 14 and 18. Such oscillations of the rotors cause corresponding oscillations of the attached rotor arms to occur, affecting the necessary oscillations of the attached accelerometers to permit measurement of rotation in accordance with the Coriolis principle.

Radially-directed sets of spring assemblies 152 through 156 and 158 through 162 extend from the hubs 15 and 19 respectively. The spring assemblies 152 through 156 and 158 through 162 reduce the reliance of the counteroscillating system upon torque generated by buckling of the drive vanes. This permits the system to operate with elastic buckling of the drive vanes limited to their fundamental modes. The assemblies are regularly-spaced about the hubs with each one being centered at the bisector of the angle separating a pair of drive vanes. Referring to the representative spring assembly 152 of the upper rotor 14, it is seen to comprise a pair of radially-directed, stiff planar springs 164, 166 that extend from the hub 15. The distal ends of the springs 164 and 166 are interconnected by means of a trapezoidal-shaped connector piece 168. The springs 164 and 166 are sized and arranged to be the dominant factors in establishing the common frequency of oscillation of the rotors 14 and 18. Corresponding-located spring assemblies of the rotors 14 and 18 are coupled to one another in pairs by means of conventional fasteners (not shown), laser welding or like processes.

In operation, counter-oscillatory movements of the rotors 14 and 18 about their common central axis result from forces induced by the inward and outward flexing of the hexagonal ring 126. This is to be contrasted to the much more complex arrangements of the prior art in which pairs piezoelectric elements fixed to opposed surfaces of radial vanes alternately extend and contract causing the vanes to bend, or flex, individually to impart a reactive torque on the rotor hub. The hexagonal ring 126 is fixed to the mounting base 12 by means of standoffs 170 through 180 that are fixed to and radially arranged about the base 12 in alignment with and bonded the lower surfaces of the substantially-straight ring segments 148, 150, 140, 142, 144 and 146 respectively. Each of the standoffs 170 through 180 is formed of a resilient material, such as rubber, to accommodate the inward and outward movements of the attached ring segments, discussed below.

An enlarged view of the representative accelerometer 54 that is fixed to the arm 60 of the upper rotor 14 is identified and located by means of a call-out arrow 182. An orthogonal coordinate system is superimposed on the accelerometer 54 for indicating various axes, the significance of each of which will become apparent below. An axis denoted "OA" (output axis) is parallel to the hinge axis of the accelerometer 54. This axis is perpendicular to an axis "PA" (pendulous axis) that passes through the center of gravity in the plane of the pendulous mass of the accelerometer 54. An input axis "IA" is perpendicular to the plane of the axes OA and PA.

Figure 2A:
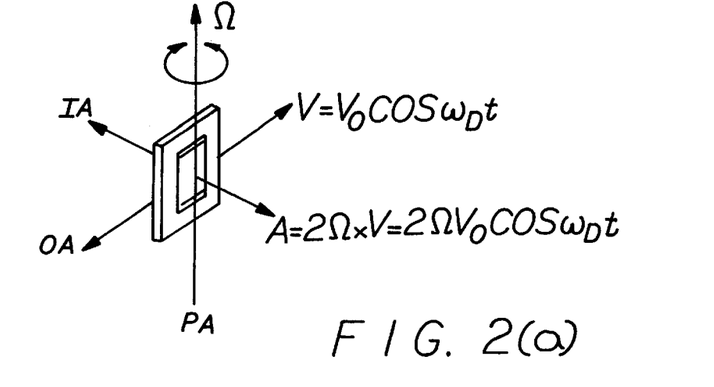
FIGS. 2(a) and 2(b) are schematic views for illustrating, in combination, the mechanics of an accelerometer of a counterbalanced multisensor.
Figure 2B:
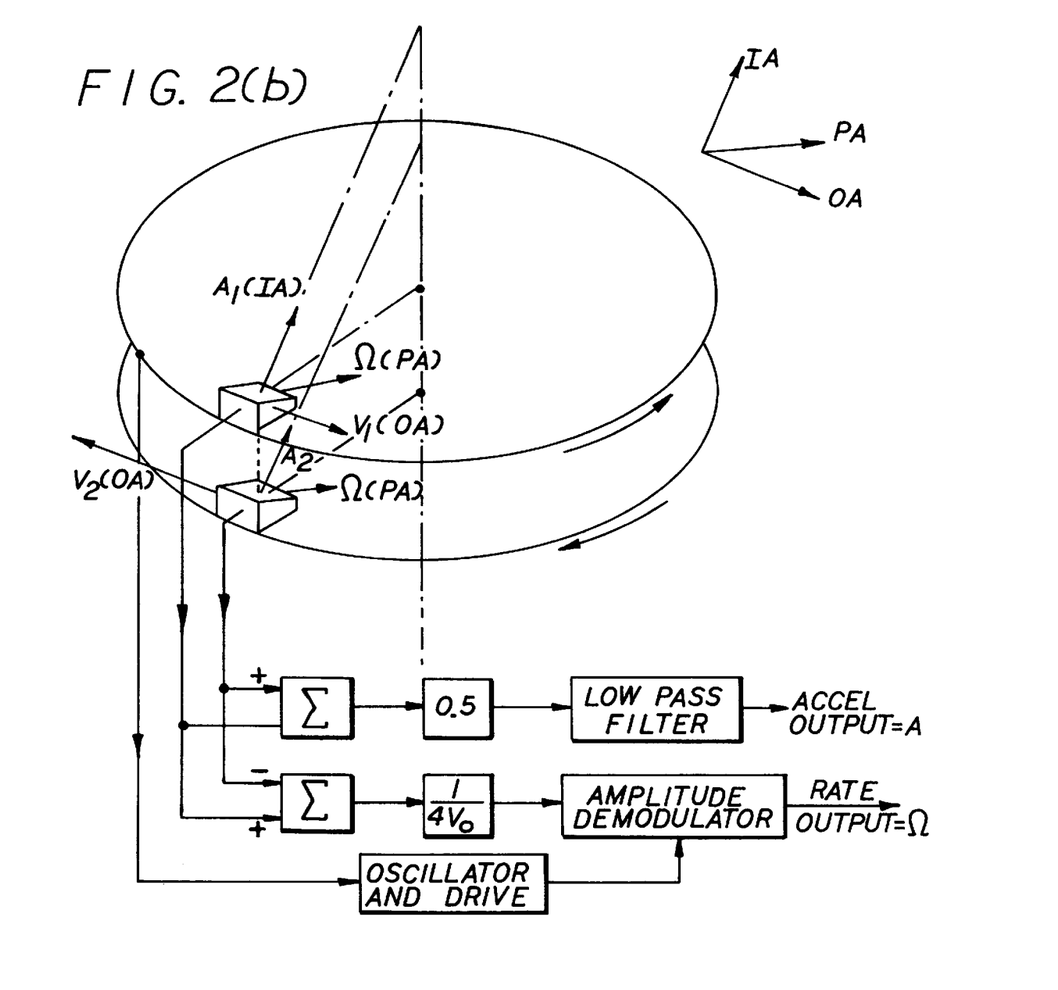

The theory of operation of a counterbalanced multisensor will be discussed with reference to FIGS. 2(a) and 2(b), each of which provides a schematic view in perspective of a central aspect of the system. In FIG. 2(a), there is illustrated a representative accelerometer 54, with axes and vectors marked thereon indicative of a Coriolis acceleration output. FIG. 2(b) schematically illustrates the operation of a pair of such accelerometers within the counter-oscillating system of an IMU.

In such a system, six batch fabricated silicon linear accelerometers permit complete measurement of the linear acceleration and angular rate of a host vehicle in body-fixed coordinates by making direct measurements of total acceleration with respect to the body axes. The linear and Coriolis components of the total acceleration are then segregated, and the latter component operated on by "demodulating" it to determine body angular rates.

Referring specifically to FIG. 2(a), Coriolis acceleration is measured as the cross product $\overline{A}_c = 2\overline{\Omega} \times \overline{V}$, where $\overline{\Omega}$ is the body angular rate vector, and $\overline{V}$ is the instantaneous relative velocity of the accelerometer mount with respect to the host vehicle. Thus the accelerometer, when set in motion with a relative velocity in the direction of the output axis OA, permits an angular rate about the pendulous axis PA to be observed as part of an acceleration measured along the input axis IA. The Coriolis acceleration measurement thus permits angular rate $\Omega$ to be observed with the linear accelerometers of the multisensor. A procedure is then required for separating the linear and Coriolis acceleration components from one another.

One approach to such separation is to induce a sinusoidal relative velocity in the form $$\overline{V} = \overline{V}_o \operatorname{Sin} \omega t \tag{1}$$

The corresponding Coriolis acceleration is then $$\overline{A}_c = 2\overline{\Omega} \times \overline{V}_o \operatorname{Sin} \omega t \tag{2}$$

Thus, as long as no additive linear acceleration produces a component within the frequency band of the velocity excitation frequency, then demodulation at $\omega_D$ of the accelerometer's output yields a measurement of angular rate about the PA axis of (each) accelerometer. Similarly, the low frequency linear acceleration component is obtained by a low-pass filtering operation. As mentioned earlier, linear accelerations usually occur at very low frequencies, while the angular velocity is modulated with a much higher frequency $\omega_D$.

Referring now to FIG. 2(b), the accelerometers are oriented with their input axes inclined with respect to their corresponding planes of motion to move at 180° out of phase with one another on the counter-vibrating rotors 14, 18. In the presence of an angular rate $\Omega$ along PA, and an acceleration component A along IA (see FIG. 2(a)), the total acceleration measured by each is:

$$A_1 = A + 2\Omega V_0 \tag{3}$$

$$A_2 = A - 2\Omega V_0 \tag{4}$$

Thus, $$A = \tfrac{1}{2}(A_1 + A_2) \tag{5}$$

and $$\Omega = (\tfrac{1}{4} V_0)(A_1 - A_2) \tag{6}$$

A more accurate procedure for obtaining $\Omega(t)$ is derived from the general relations $$A_1(t) = A(t) + 2\omega(t) V_0 \operatorname{Sin} \Omega t + e_1(t) \tag{7}$$

$$A_2(t) = A(t) - 2\omega(t) V_0 \operatorname{Sin} \Omega t + e_2(t) \tag{8}$$

where $e_1(t)$ and $e_2(t)$ are high-frequency vibration effects that may be considered as error terms. Upon elimination of A(t), the following relation results $$\Omega(t) \sin \omega t = (\tfrac{1}{4}V_0)[A_1(t)-A_2(t)]-(\tfrac{1}{4}V_0)[e_1(t)-e_2(t)] \quad (9)$$

Assuming that none of the structural natural frequencies of the multisensor is close to the modulated band of $\Omega(t)$, then $e_1(t)$ and $e_2(t)$ basically cancel one another, leaving the following expression for $\Omega(t)$:

$$\Omega(t) \sin \omega t = (\tfrac{1}{4}V_0)[A_1(t)-A_2(t)] \quad (10)$$

Figure 3A:
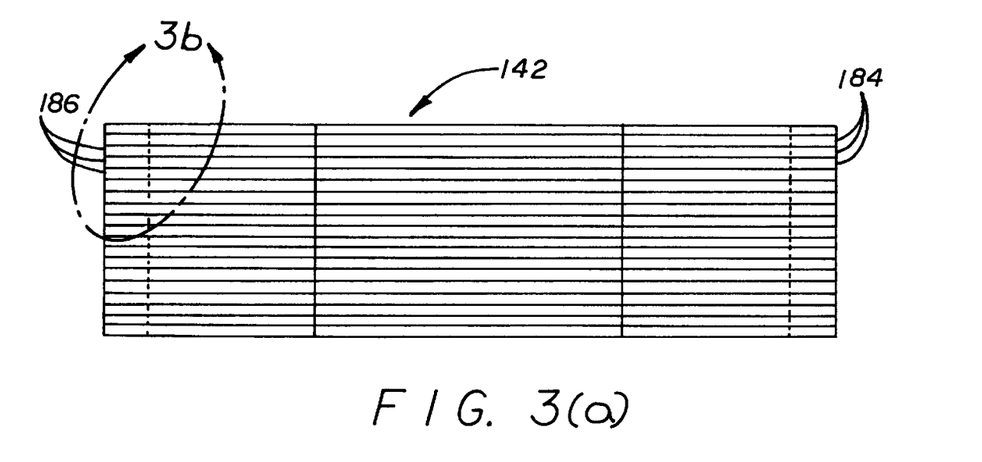
FIGS. 3(a) and 3(b) are cross-sectional views of a substantially-straight segment of the piezoelectric drive ring for illustrating the arrangement and wiring of associated circuitry.
Figure 3B:
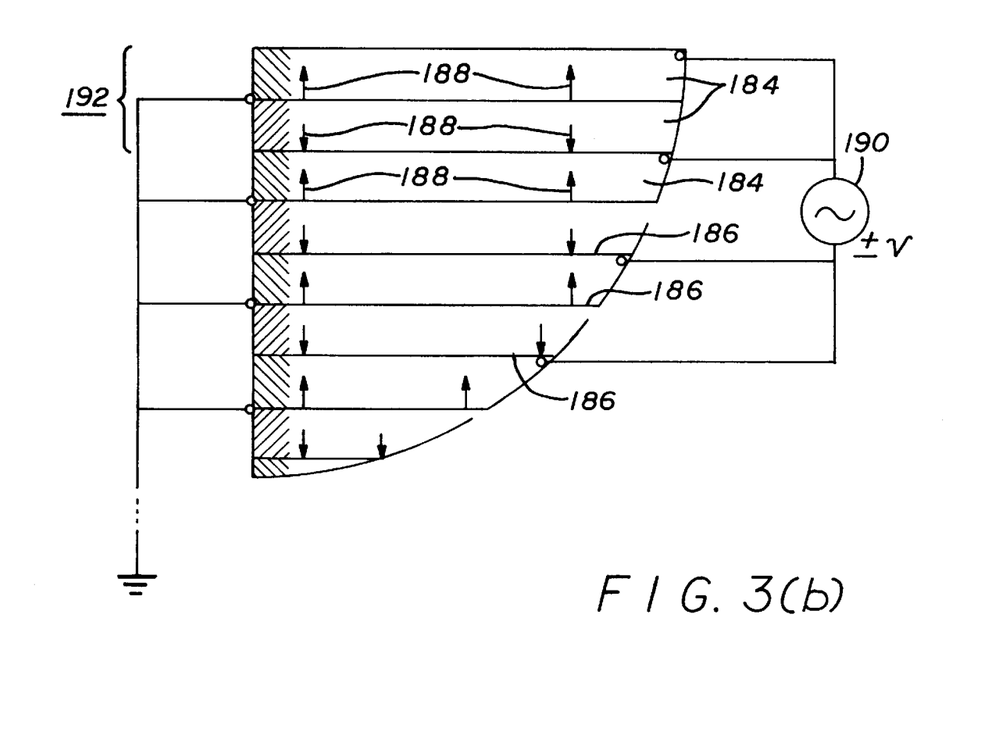

FIGS. 3(a) and 3(b) are cross-sectional views of a representative substantially-straight segment 142 of the piezoelectric ring 126 for illustrating the arrangement and wiring thereof. The ring 126, comprising adjoined substantially-straight ring segments 140 through 150, alternately expands and contracts with respect to its peripheral and radial dimensions in response to an applied a.c. signal. The effect of such controllable changes in the dimensions of the ring 126 will be illustrated by the sequence of FIGS. 4(a), 4(b) and 4(c) that follow. Essentially, such motion produces preferential bucklings of the drive vanes that result in oscillation of the rotor hubs 15 and 19.

Referring back to FIG. 3(a), it can be seen that the representative ring segment 142 comprises a laminate of layers 184 of preferentially-poled piezoelectric material. The layers of piezoelectric material 184 are separated from one another by relatively-thin planar layers 186 of conductive material that act as electrodes for imposing electrical fields of alternating direction within the piezoelectric layers 184 to produce corresponding periodic changes in the lengths of the ring segments. The layers 186 are preferentially of aluminum or like metallic composition and are bonded to the adjacent layers 184 of piezoelectric material by means of a suitable adhesive such as EPOXY. In addition to providing an electrically-conductive element for imposing electrical fields upon the layers 184, the metallic layers 186 enhance the thermal compatibility of the piezoelectric ring 126 with the metal (preferably titanium) drive vanes 78 through 100 by increasing the resultant coefficient of thermal expansion of the piezoelectric drive ring 126 to more closely match that of the metal drive vanes 78 through 100.

FIG. 3(b) is an enlarged view of section 3(b) of FIG. 3(a) for illustrating the manner in which the piezoelectric layers 184 of the representative ring segment 142 are arranged and wired for operation. Arrows 188 indicate the polarities of the various layers 184 of piezoelectric material of the ring segment 142. As can be seen, adjacent layers 184 are of opposite polarities. Referring to the circuit for introducing activating signals to the segment 142 (and, for that matter to the entire hexagonal ring 126), it may be observed that the conductive layers 186 are alternately electrically connected to ground and to an a.c. voltage source (v(t)) 190.

In order to appreciate the process by which the alternation of the dimensions of the ring 126 is accomplished, it should first be recognized that the above-described wiring of the laminated piezoelectric layers 184 may be viewed or considered as a multiplicity of repeating pairs of layers of adjacent oppositely-poled piezoelectric material separated by a common ground electrode layer with electrode layers for receiving an identical a.c. signal fixed to the remote surfaces of each layer of piezoelectric material in a sandwich-like configuration. Considering, for example, the pair of layers indicated at 192 in FIG. 3(b), it can be seen that the adjacent piezoelectric layers 184 of the pair 192 simultaneously lengthen and shorten in accordance with the instantaneous polarity of the a.c. signal v(t) output from the voltage source 190. As the ring segment 142 comprises nothing more than a multiplicity of layer pairs 192 comprising piezoelectric material poled and wired accordingly it will be appreciated that the voltage source 190 alternately causes simultaneous expansions and contractions of all layers of piezoelectric material comprising the ring segment 142. As the other ring segments may be continuous with those comprising the segment 142, all segments of the ring 126 will simultaneously lengthen and shorten in response to the voltage source 190, resulting in the above-referenced dimensional expansion and contraction of the drive ring 126.

Figure 4A:
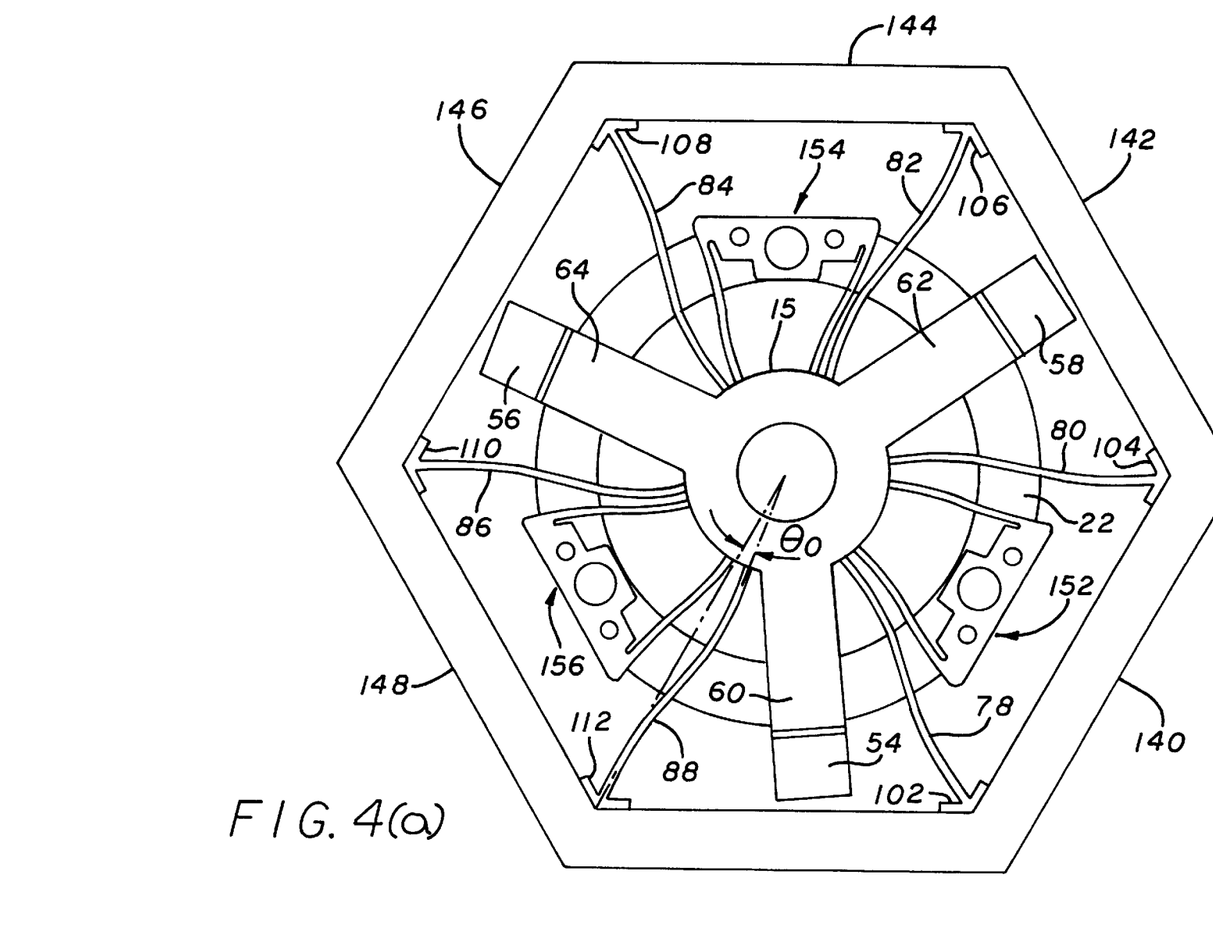
FIGS. 4(a), 4(b) and 4(c) are sequential top planar views that illustrate the oscillation of the upper rotor as induced by means of a parametric drive in accordance with the invention, it being understood that the same principles apply to the driving of oscillation of the lower rotor, albeit 180 degrees out-of-phase.
Figure 4B:
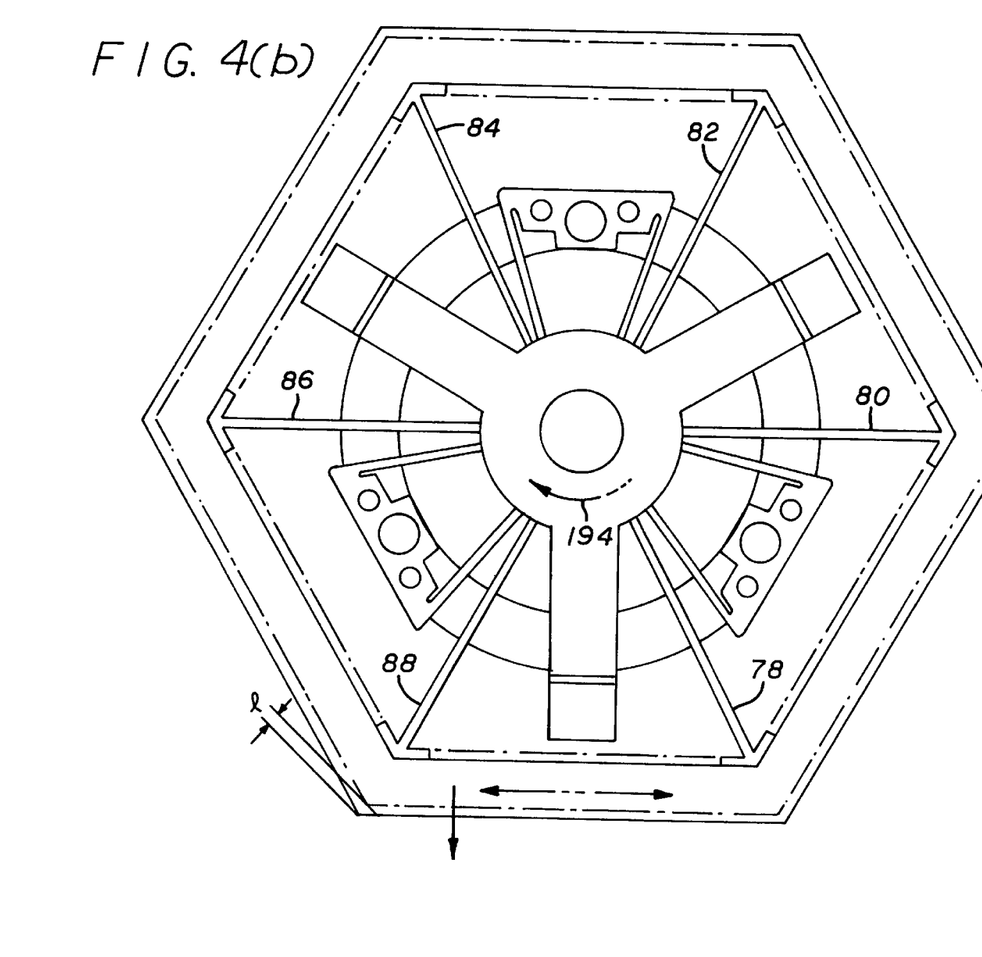
Figure 4C:
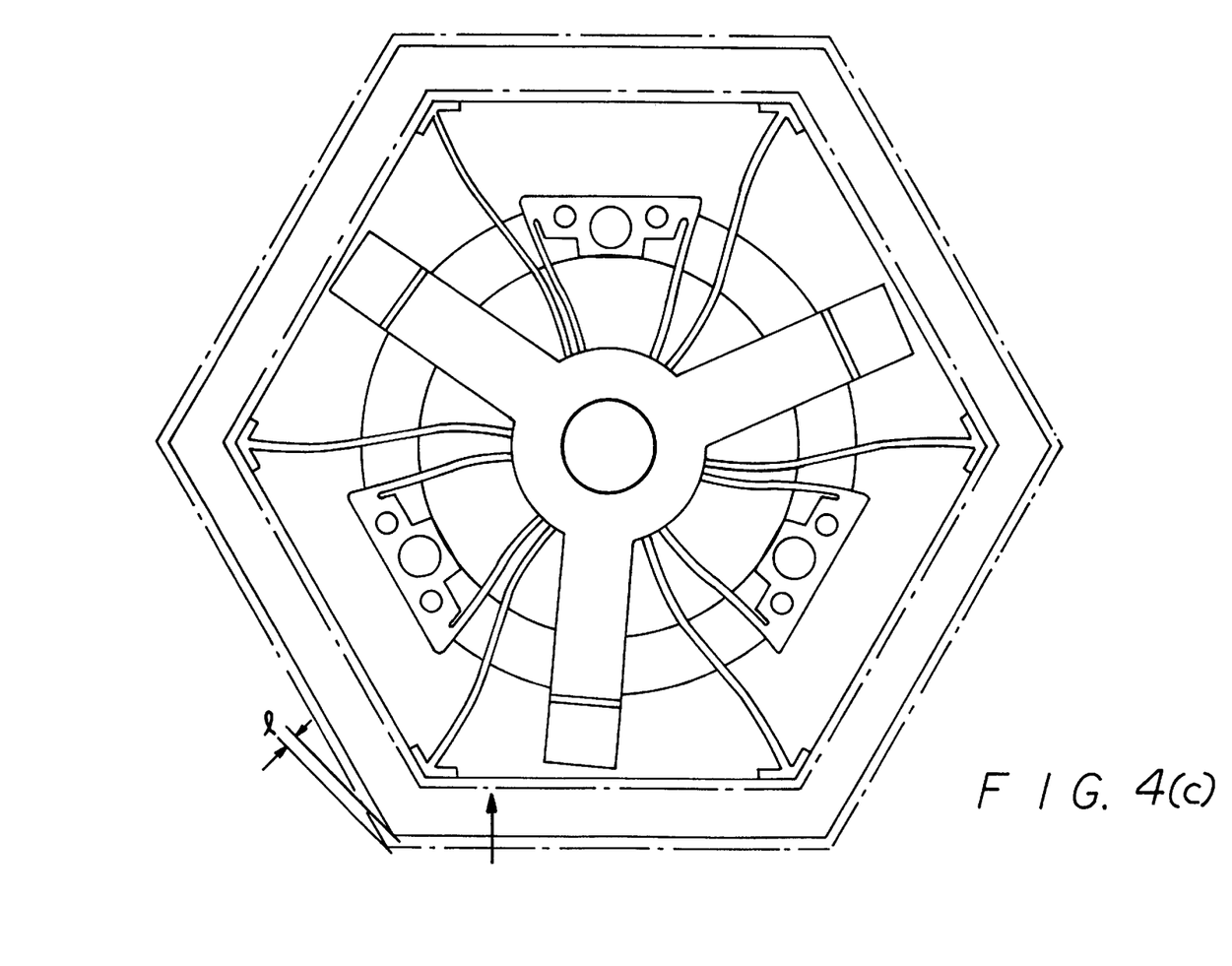

FIGS. 4(a), 4(b) and 4(c) are a series of sequential top planar views for illustrating the oscillation of the upper rotor (with certain details removed for purposes of clarity) as induced by means of the parametric drive of the invention. The description of these figures will proceed with a discussion of the operation of the parametric drive. FIG. 4(a) illustrates the initial or "at rest" configuration in which the rotor 15 is angularly displaced key a predetermined angular amplitude $\theta_o$. The angle $\theta_o$ is "set" (i.e. preferential fundamental mode bucklings of the drive vanes 78 through 100) during assembly by turning off the voltage previously holding the ring 126 at maximum diameter to cause the ring 126 to contract while tooling that includes stops for causing the drive vanes of a particular rotor to bend in a desired initial direction ($+\theta_o$ or $-\theta_o$) is in place. Thereafter, the imposed fundamental mode biasing of the drive vanes of a rotor ("null buckling mode") will be maintained. Such buckling is only reversed thereafter in use by the imposition of rotational momentum as described below.

In the sequential example illustrated in FIGS. 4(a) through 4(c), it is assumed that removal of a driving voltage locks the ring 126 at its minimum configuration leaving the drive vanes 78 through 88 in their initially-biased conditions.

The preset curvature of the representative driving vane 88 is such that a tangent to the proximate end thereof is orthogonal to the peripheral edge of the central hub 15 at the point of attachment. (It will be appreciated that the driving vanes of the lower rotor are set for an opposite angular bias $-\theta_o$ in their initially-biased at rest configurations.)

Before proceeding further, it is pointed out that the piezoelectric material of the layers 184 is of the so-called positively-poled type. It is a characteristic of piezoelectric material that such material is either of a type that expands or contracts in the presence of an electric field aligned in the direction of poling and vice versa. Material of the former type is known as "positively-poled" while that of the latter type is "negatively-poled". This nomenclature reflects the fact that positively-poled dielectric materials are characterized by a positive $d_{31}$ coefficient (cross piezoelectric coefficient) while negatively-poled piezoelectric materials are characterized by a negative $d_{31}$ value.

FIG. 4(b) illustrates the upper rotor 14 as it passes through the neutral position from $\theta_o$ to $-\theta_o$ upon application of the driving sinusoidal signal v(t). This occurs at maximum expansion of the drive ring 126 which takes place when the value of v(t) creates electrical fields within the layers 184 of piezoelectric material of maximum value coinciding in direction with the poling of the (assumed positively-poled) layers 184. The full expansion of the drive ring 126 releases the initial buckling of the locked drive vanes 78 through 88 as shown. An arrow 194 indicates the resultant direction of rotation of the hub 15 upon "release" of the at rest elastic buckling $\theta_o$.

As mentioned earlier, the potential energy stored in the spring assemblies 152 through 156, when deformed, enables the torque exerted by the drive vanes (via the force that results from the release of elastic buckling energy) upon the central hub 15 (and associated rotor arms 60 through 64) to be sufficient to cause rotation thereof. That is, the spring assemblies 152 through 156 reduce the amount of elastic energy that the drive vanes 78 through 88 must possess to sustain angular rotor oscillations of maximum amplitude $\theta_0$.

The above follows from comparative analyses of systems (rotor hub and arms) of inertia I (1) driven solely by drive vanes and (2) driven by drive vanes assisted by spring assemblies. In the first case, the amount of torque T required to cause an angular displacement $\theta$ is:

$$T = I\ddot{\theta} \tag{11}$$

For sinusoidal motion, $$T = T_o \sin \omega t; \text{ and} \tag{12}$$

$$\theta = \theta_o \sin \omega t \tag{13}$$

Substituting equations 12 and 13 into equation 11, $$-I\omega^2 \theta_o = T_o \tag{14}$$

Solving, $$|\theta_o| = |T_o/I\omega^2| \tag{15}$$

The above expression represents the relationship between $\theta_o$ and the maximum sinusoidal torque $T_o$ for sustaining the sinusoidal oscillations. It is generally the case that, to be feasible, the deformations of the drive vanes must be limited to their fundamental bending or buckling modes. Otherwise, a high degree of design complexity is encountered. The introduction of the spring assemblies 152 through 156 provides elements to assist the drive vanes in torquing the rotors. The above relationship between torque and angular displacement is modified by the presence of the spring assemblies as below:

$$I\ddot{\theta} + k\theta = T \tag{16}$$

Where k is the spring constant of the spring assemblies 152 through 156.

Solving as before, $$|\theta_o| = |T_o/(I\omega^2 - k)| \tag{17}$$

Comparing equation 17 to equation 15, it can be seen that the maximum torque $T_o$ that the drive vanes must exert to sustain sinusoidal rotor oscillation of maximum amplitude $\theta_o$ is reduced as a result of the "assistance" they receive from the spring assemblies. In the limiting case of very strong spring assemblies ($k = I\omega^2$) the rotor structure requires no energy from the drive vanes.

Thus, by properly choosing the resultant spring constant k of the assemblies 152 through 156, the drive vanes 78 through 88 may be designed to exert sufficient energy when released from their lowest mode buckled shapes to attain and maintain (through the flexing of the ring 126) the desired amplitude of oscillations of the upper (and lower) rotors in response to sequential expansions and contractions of the dimensions of the drive ring 126.

FIG. 4(c) is a top plan view or the upper rotor upon completion of one-half cycle of oscillation. As can be seen, the position of the rotor 14 is static, the kinetic energy of the system being instantaneously stored as potential energy for reconversion to kinetic energy during the succeeding half cycle.

It can be demonstrated that the frequency of the cycling of the drive ring 126 (e.g. the frequency of the signal v(t)) must be twice that of the desired resultant frequency of oscillation of the rotor 14 (and of the rotor 18). This follows from the fact that, as proven above, sufficient torque T is generated through fundamental or lowest mode elastic buckling of the drive vanes of the rotor. As a result, the following relationship exists between the inward radical contraction of the ring 126, l (refer to FIG. 4(a)), and the resultant angular deflection $\theta$.

$$l = C\theta^2 \tag{18}$$

As mentioned above, the oscillatory motion of the rotors is of the following form:

$$\omega = \theta_o \sin \omega t \tag{19}$$

Substituting, $$l = C\theta_o^2 \sin^2 \omega t \tag{20}$$

Substituting the applicable well-known trigometric identity, equation 20 reduces to $$l(t) = (\tfrac{1}{2})C\theta_o^2 (1 - \cos 2\omega t) \tag{21}$$

Comparing equation 13, defining the sinusoidal oscillation of the rotor, to the above expression for the periodic contraction of the ring 126 that results from application of the driving signal v(t), it is confirmed that the rotor is driven to oscillate at one half the frequency of the periodic expansion and contraction of the drive ring 126. The preceding analysis also shows that the rotor assembly need not be driven at resonance to sustain oscillations. The frequency with which the piezoelectric ring 126 is driven which determines the frequency of counteroscillation of the rotor assembly while the resonant frequency of the rotor is primarily set by the spring assemblies. Preferentially, $\omega$ is chosen so that the rotor assembly is driven within 10 percent of resonance. (The counteroscillating rotors form a very high Q (greater than 1000) system with little dumping. While it will be seen to be advantageous to drive this system off resonance, excessive variance from resonance may increase the burden upon the drive vanes to the extent that higher order buckling modes would be necessary. This is a consequence to be avoided in design.)

By making operation of the multisensor independent of the resonant frequency, one need not be concerned with numerous factors, including manufacturing tolerances, temperature and the like that may cause the value of resonance to vary from device to device and/or cause that of a particular device to vary ever time. Furthermore, by driving the rotor assembly off resonance, virtually instantaneous start up of the multisensor 10 is obtained.

While the invention has been described with reference to its presently preferred embodiment, it is not limited thereto. Rather, this invention is limited only insofar as it is defined by the following set of patent claims and includes within its scope all equivalents thereof.

What is claimed is:

1. A multisensor comprising, in combination:
   a) a substantially planar mounting base;
   b) an upper and a lower rotor, each of said rotors including a central rotor hub and at least one radially-directed arm fixed to said hub having a distal end;
   c) said rotors being aligned along a common central axis and coupled to one another to form a rotor assembly;

d) an accelerometer fixed adjacent to said distal ends of said rotor arms;

e) at least one vane extending radially from said hubs of said upper and lower rotors, said vanes having distal ends remote from said rotor hubs;

f) a ring, said ring surrounding said rotor assembly;

g) the distal ends of said vanes being fixed to the inner surface of said ring;

h) said ring being of piezoelectric composition;

i) at least one standoff fixed, at its opposed ends, to said ring and to said base; and j) an electrical circuit coupled to said ring for supplying a signal thereto to cause the radial dimension thereof to expand and contract.

2. A multisensor as defined in claim 1 wherein said ring comprises a plurality of layers of piezoelectric material.

3. A multisensor as defined in claim 2 further including a planar metallic electrode between adjacent layers of piezoelectric material.

4. A multisensor as defined in claim 3 wherein said planar electrode comprises aluminum.

5. A multisensor as defined in claim 4 wherein said ring comprises a closed configuration of a plurality of substantially-straight ring segments.

6. A multisensor as defined in claim 5 wherein said ring comprises six substantially straight ring segments.

7. A multisensor as defined in claim 3 further including:

a) an even number of layers; and b) adjacent layers are of oppositely-poled piezoelectric material.

8. A multisensor as defined in claim 3 wherein said electrical circuit includes:

a) a first set of planar electrodes intermediate every other adjacent pair of layers of piezoelectric material being at ground potential; and b) a voltage source commonly electrically coupled to a second set of planar electrodes whose locations alternate with said electrodes of said first set.

9. A multisensor as defined in claim 8 wherein said voltage source is an a.c. source.

10. A multisensor as defined in claim 5 wherein said distal ends of said vanes are fixed adjacent the intersections of said substantially-straight ring segments.

11. A multisensor as defined in claim 9 wherein:

a) a corner flange is fixed to the distal end of each vane; and b) said flange is bonded to the inner surface of said ring.

12. A multisensor as defined in claim 11 wherein said corner flange comprises intersecting planar surfaces.

13. A multisensor as defined in claim 12 wherein said corner flange is laser-welded to the inner surface of said ring adjacent the intersection of substantially-straight ring segments.

14. A multisensor as defined in claim 1 wherein each of said vanes is biased with a null buckling mode.

15. A multisensor as defined in claim 14 wherein said null buckling mode is of the lowest order.

16. A multisensor as defined in claim 14 wherein said null buckling modes of said vanes of said upper and lower rotors are of opposite senses.

17. A multisensor as defined in claim 1 wherein each of said standoffs is of resilient composition.

18. A multisensor as defined in claim 17 wherein said standoffs are of rubber composition.

19. A multisensor as defined in claim 5 wherein said standoff is fixed intermediate the ends of a substantially-straight ring segment.

20. A multisensor as defined in claim 19 wherein said standoff is fixed adjacent the middle of said substantially-straight ring segment.

21. A multisensor as defined in claim 19 including six standoffs.

22. A multisensor as defined in claim 1 further including:

a) at least one spring assembly extending from each of said hubs of said upper and lower rotors;

b) a ring intermediate said rotors; and c) said spring assemblies of said upper and lower rotors being mutually fixed to said ring.

23. A multisensor as defined in claim 22 wherein each of said spring assemblies includes at least one outwardly directed spring.

24. A multisensor as defined in claim 23 wherein each of said spring assemblies further includes:

a) a pair of outwardly-directed springs; and b) the distal ends of said springs being joined to one another by a connector piece whereby each of said spring assemblies is of generally-trapezoidal shape.

25. A multisensor as defined in claim 24 further including:

a) a plurality of vanes arrayed symmetrically about each of said upper and lower rotor hubs; and b) a plurality of spring assemblies arranged symmetrically about each of said upper and lower rotor hubs.

26. A multisensor as defined in claim 25 further characterized in that:

a) six vanes are fixed to each of said upper and lower rotor hubs; and b) three spring assemblies are fixed to each of said upper and lower rotor hubs.

* * * * *